March 20, 1962 G. H. SYROVY 3,025,672
ENGINE ACCESSORY INSTALLATION
Filed July 21, 1959 2 Sheets-Sheet 1

INVENTOR.
Gerald H. Syrovy
BY
Paul Fitzpatrick
ATTORNEY

INVENTOR.
Gerald H. Syrovy
BY
Paul Fitzpatrick
ATTORNEY

United States Patent Office 3,025,672
Patented Mar. 20, 1962

3,025,672
ENGINE ACCESSORY INSTALLATION
Gerald H. Syrovy, Los Angeles, Calif., assignor to General Motors Corporation, Detroit, Mich., a corporation of Delaware
Filed July 21, 1959, Ser. No. 829,184
3 Claims. (Cl. 60—39.66)

My invention relates to turbine engines and is particularly suited to the requirements of air turbo-rocket engines, gas turbines of the usual type having coaxial turbines and compressors, and other engines of similar general structure. The invention is particularly directed to improvements in the installation and drive of accessories of such engines so as to make use of space available within the engine for accessories such as oil pumps.

The nature of the invention and the advantages thereof will be apparent to those skilled in the art from the succeeding detailed description of a preferred embodiment thereof. The invention is shown and described herein as incorporated in an engine of the air turbo-rocket type. However, more conventional gas turbine engines with a compressor and a turbine coaxially arranged are similar in significant respects in structure to the engine described herein, and it will be apparent the principles and structural features of the invention are suited to incorporation in such gas turbines.

Referring to the drawings, FIGURE 1 is a partial view of an air turbo-rocket engine, the view being taken in a plane containing the axis of the engine.

Figure 1:
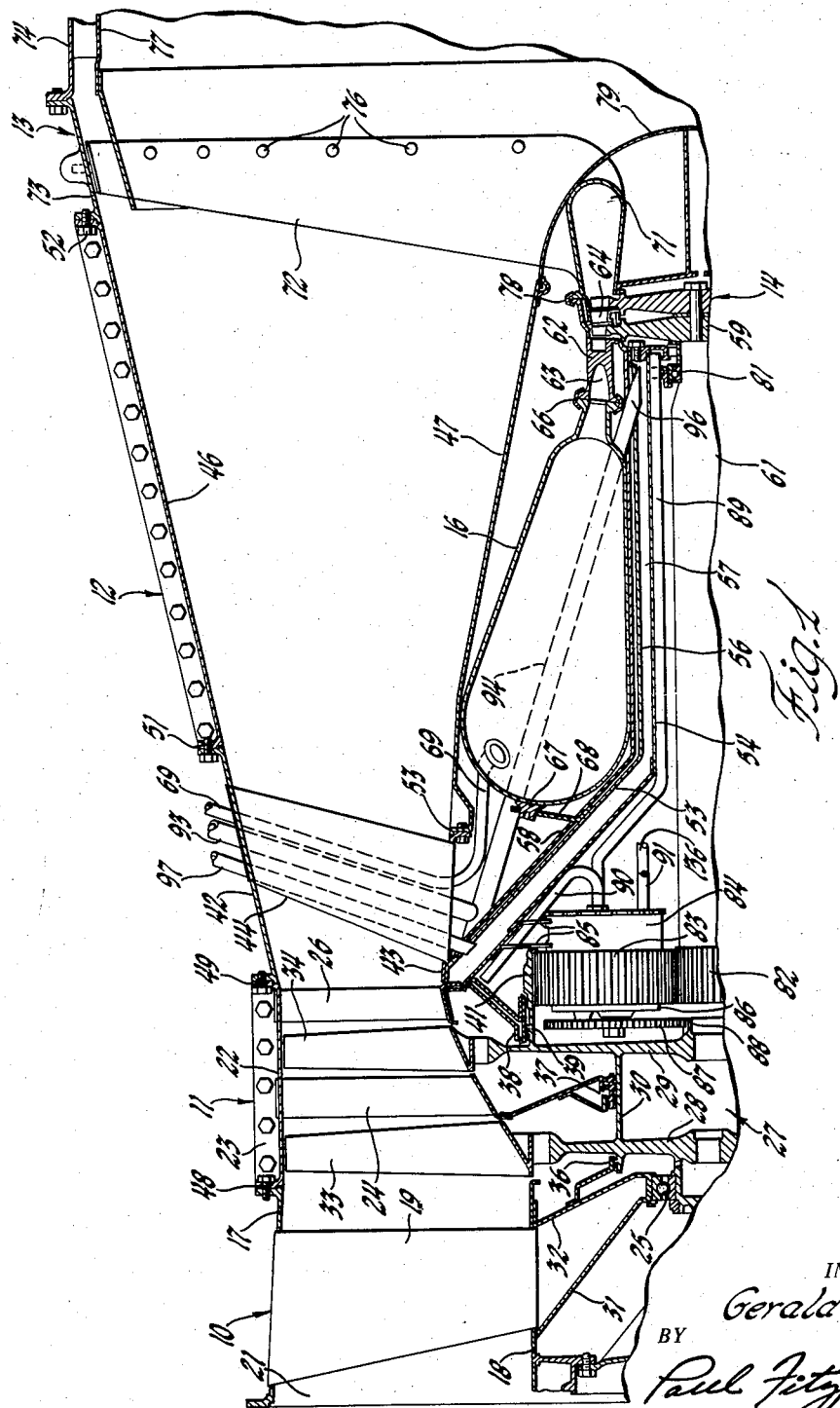

Proceeding first to the general structure of the engine illustrated, it is a jet propulsion engine of the air turbo-rocket type. It comprises an air inlet section 10, a compressor or multi-stage fan 11, an intermediate outer case 12, a combustion section 13, only the forward part of which is illustrated, a turbine 14, and decomposition chambers 16 supplying motive fluid to the turbine.

The air inlet section 10 comprises an outer wall 17, an inner wall 18, and a number of struts 19 connecting the walls. Walls 17 and 18 define an air inlet passage 21 which may be supplied through suitable air inlet means, not illustrated. The compressor 11 comprises an outer case 22 which may be in two semi-cylindrical sections joined at bolting flanges 23. Two rows of stator blading 24 and 26 are mounted in the compressor case. The compressor rotor 27 comprises disks 28 and 29 connected by a web 30. A stub shaft extending from the forward disk 28 is supported by a ball bearing 25 mounted in a support defined by conical plates 31 and 32 fixed to the inner wall 18 of the air inlet. Rotor blades 33 and 34 are mounted on the disks 28 and 29. Suitable labyrinth seals 36, 37, and 38 are provided between the fixed and rotating parts of the compressor. A flange 39 integral with the rear compressor wheel 29 is machined to provide an internal ring gear 41 through which power is supplied to drive the compressor and by means of which the rear end of the rotor is supported.

The intermediate case section 12 comprises an annular compressor outlet portion defined by an outer wall 42, an inner wall 43, and struts 44 connecting the two walls. The compressor outlet section discharges into a diverging air duct defined by an outer wall 46 made in two sections joined along longitudinal bolting flanges and by an inner wall 47. The parts defining the air duct which have been described are connected by rings of bolts at 48, 49, 51, and 52 to provide a rigid structure upon assembly of the engine.

A shaft support or shaft housing 53 which is welded to the inner wall portion 43 extends from the compressor to the turbine and provides part of the support for the turbine 14 and decomposition chamber 16. It will be noted that the forward portion of the shaft housing is conical and the rear portion cylindrical. The shaft housing comprises an inner wall 54 and a wall 56 defining between them a passage 57 extending longitudinally of the engine. The shaft housing also includes a third wall 58 which is a heat shield.

The turbine 14 comprises a two-stage rotor 59 with two bladed wheels bolted to a shaft 61 extending forward to the compressor. It also comprises a stator 62 defining inlet nozzles 63 and an interstage nozzle 64. The stator is bolted to the rear end of the shaft housing 53.

The turbine nozzles 63 are supplied with motive fluid from the recomposition chamber 16, which may be five in number. The decomposition chambers are connected to the first-stage turbine nozzle 63 by ring clamps 66 and are supported at their forward ends by bosses 67 piloted in supports 68 extending from the wall 56 of the shaft housing. The decomposition chambers are supplied with a suitable fuel through fuel lines 69 extending through some or all of the struts 44. The fuel is of the type which decomposes with release of sufficient energy to provide hot gas under pressure to drive the turbine 14. The nature of the fuel and the means by which decomposition is initiated and maintained are immaterial to the disclosure of this invention.

After the decomposed gases have expanded through the turbine 14 to provide power to drive the compressor 11, they are burned in the air flowing through the compressor 11. The turbine exhausts into an annular chamber 71 which communicates with a considerable number, such as twelve, of radial struts 72, the outer ends of which are suitably connected as by a radially slidable pilot to a case section 73 bolted to section 46 and bolted to a burner case and exhaust duct 74. Each strut 72 is provided with a number of openings 76 for discharge of the combustible gas into the air stream. The gas is ignited and burns in the air flowing through a combustion shroud 77 supported in the duct 74. The products of this combustion are discharged through a suitable variable nozzle (not shown) to provide a propulsive jet.

The struts 72 may be welded to the turbine exhaust annulus 71 which in turn is connected to the turbine stator 62 by a ring clamp 78. The strust 72, therefore, provide a part of the support for the turbine. A tailcone structure 79 closes off the rear end of the turbine.

The turbine shaft 61 is mounted in a ball bearing 81 supported in the rear end of the shaft housing. A pinion 82 is integral with or attached to the forward end of the shaft. The pinion meshes with three gears 83 mounted for rotation about axes fixed in the engine, which mesh with ring gear 41. Gears 82, 83, and 41 constitute a reduction gearing structurally similar to ordinary planetary gearing connecting the turbine to the compressor. The gears 83 are mounted by suitable anti-friction bearings on hollow trunnions fixed in supports 84 mounted on the shaft housing by brackets 85. The hollow trunnions may accommodate various engine accessories, and particularly engine oil pumps such as a pump 86. Pump 86 may include pressure and scavenge oil pumps. Oil may be scavenged from bearing 81 through a conduit 89 within the shaft housing and be discharged through a conduit 90. A second outlet from the pump is represented by the fragmentary conduit 91. Pump 86 is driven by a gear 87 on the pump shaft and a pinion 88 integral with compressor disk 29. Pinion 88 may be similarly coupled to accessories in the other trunnions.

The accessories mounted in the trunnions and the shaft 61 are cooled and shielded from the heat radiated from the decomposition chambers 16 by circulating a cooling fluid, preferably engine oil, through the annular passage 57 between the walls 54 and 56. The oil may be introduced through conduits 93 extending through struts 44 which connect to conduits 94 extending rearwardly between the decomposition chambers 16. The rear ends of conduits 94 enter the passage 57 at its rear end at 96 and the oil flows forwardly through passage 57 and is discharged through one or more radial tubes 97 mounted in struts 44 and connected to the forward end of passage 57. The means for circulating the cooling oil through the shaft housing is the subject of my copending application entitled Engine Cooling, filed July 21, 1959, Serial No. 829,183.

Figure 2:
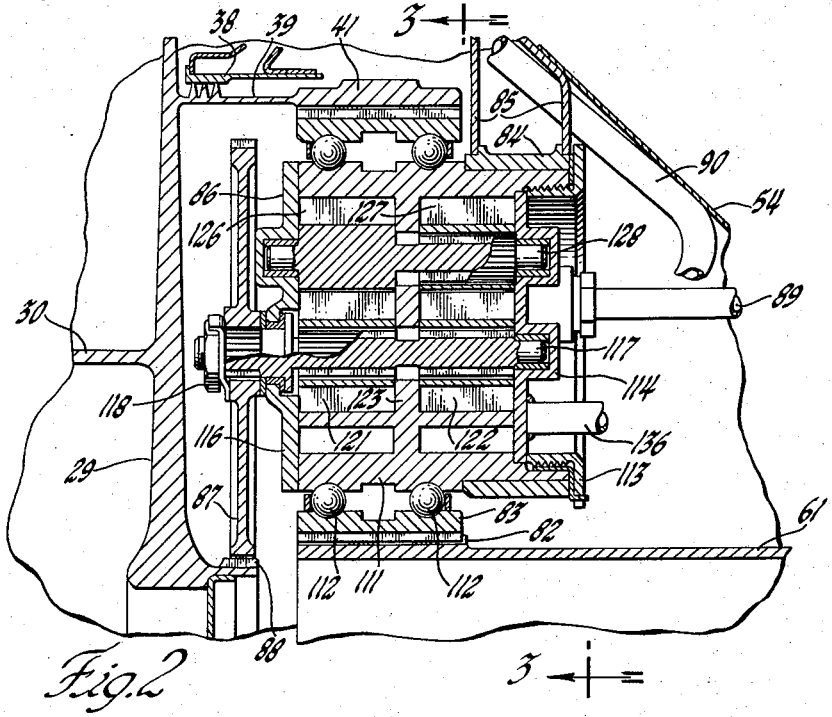
FIGURE 2 is an enlarged sectional view of a portion of FIGURE 1, showing particularly the drive gearing and lubricating oil pump.
Figure 3:
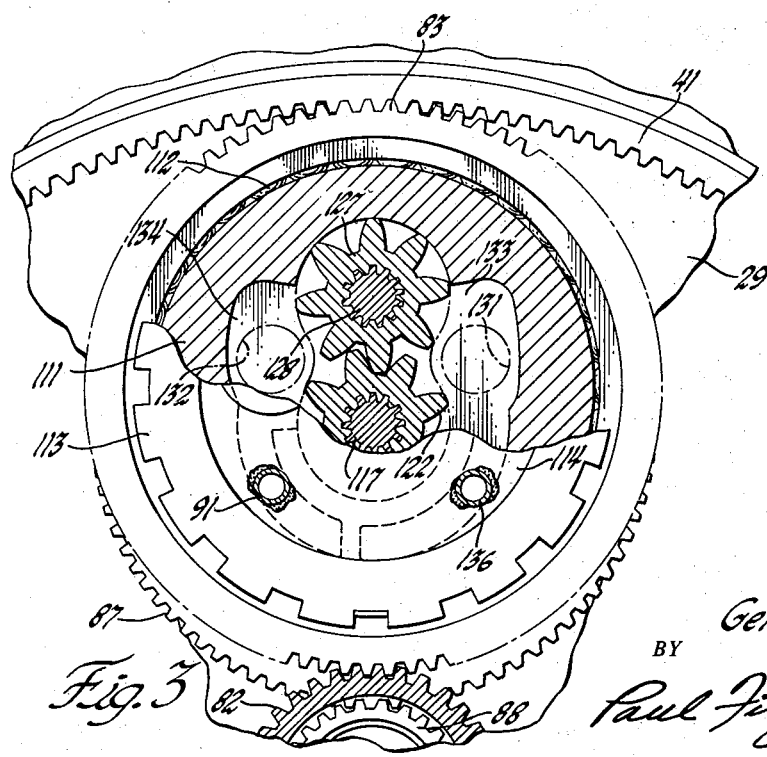
FIGURE 3 is a sectional view taken substantially in the plane indicated by the line 3—3 in FIGURE 2.

Referring to FIGURES 2 and 3, the structures of the reduction gearing and of pump 86 are shown more fully. The pump 86 comprises a body or case 111 which is externally machined to provide a race for two rows of ball bearings 112. The gears 83 are formed internally to provide races for the balls 112. The combined pump case and trunnion 111 has a portion of reduced diameter piloted in the cylindrical mount or support 84 and retained by a spanner nut 113. Nut 113 also retains one end plate 114 of the pump. The forward end plate 116 of the pump may be bolted to the body 111. The internal structure of the pump may be of any suitable type. As illustrated, the pump is a dual gear pump. Driving gear 87 is splined to the drive shaft 117 and fixed to it by a nut 118. The shaft 117, which is rotatable in suitable bushings in the end plates 114 and 116, is splined to driving pump gears 121 and 122 which are separated by a partition 123 in the case. Gears 121 and 122 mesh with driven gears 126 and 127. Gear 127 is splined onto a shaft 128 integral with gear 127 so that the gears may be removed from the case. The pump gears work in the usual cavities and may be provided with the usual porting. Oil conduits 89 and 90 connect to ports 131 and 132 entering inlet chamber 133 and outlet chamber 134 of the rear pump. Oil conduits 91 and 136 extend to similar chambers of the forward pump.

It will be apparent that the trunnions for the other gears 83 may constitute cases for or otherwise enclose additional pumps or other engine accessories such as tachometers, governors, or fuel pumps. These may be driven by additional gears such as 87 meshing with pinion 88. If not so used, the trunnion may be a simple hollow cylinder.

The cooling liquid flowing through passage 57 protects the gearing and accessory devices from the heat of the decomposition chambers and turbine, as well as that of the air flowing through the engine. In some cases, even the air is quite hot.

It will be seen that structure much like that illustrated may also be employed in the usual gas turbine in which the compressor supplies air for combustion to a combustion apparatus located similarly to the decomposition chambers 16.

I claim:

1. An engine comprising, in combination, a turbine, a shaft driven by and extending from the turbine, a device driven by the turbine, reduction gearing connecting the turbine to the driven device comprising a pinion on the shaft, a ring gear on the driven device, idler gears rotating about fixed axes meshing with the pinion and ring gear, and large fixed hollow trunnions rotatably supporting the idler gears, an engine accessory including movable parts mounted within one of the trunnions, with the trunnion acting as the housing therefor, and drive means coupling the movable parts of the accessory to the turbine.

2. An engine comprising, in combination, a turbine, a shaft driven by and extending from the turbine, a compressor driven by the turbine, reduction gearing connecting the turbine to the compressor comprising a pinion on the shaft, a ring gear on the compressor, idler gears rotating about fixed axes meshing with the pinion and ring gear, and large fixed hollow trunnions rotatably supporting the idler gears, an engine accessory oil pump including rotatable gears mounted within one of the trunnions with the trunnion acting as the housing therefor, and drive gear means coupling the pump gears to the compressor and turbine.

3. An engine comprising, in combination, a turbine, a shaft driven by and extending from the turbine, a device driven by the turbine, reduction gearing connecting the turbine to the driven device comprising a pinion on the shaft, a ring gear on the driven device, idler gears rotating about fixed axes meshing with the pinion and ring gear, and large fixed hollow trunnions rotatably supporting the idler gears, one trunnion being the case of an engine oil pump including rotatable gears mounted within the trunnion, drive means coupling the pump gears to the driven device and turbine, means for supplying hot motive fluid to the turbine mounted adjacent to the shaft, and cooling means, enclosing the shaft and reduction gearing and interposed between the shaft and the motive fluid supplying means.

References Cited in the file of this patent

UNITED STATES PATENTS

| | | |
|---|---|---|
| 2,549,528 | Price | Nov. 17, 1953 |
| 2,659,529 | Price | Nov. 17, 1953 |
| 2,689,681 | Sabatiuk | Sept. 21, 1954 |
| 2,696,712 | Lewis | Dec. 14, 1954 |
| 2,812,898 | Buell | Nov. 12, 1957 |
| 2,836,959 | McDowall et al. | June 3, 1958 |
| 2,853,227 | Beardsley | Sept. 23, 1958 |

UNITED STATES PATENT OFFICE
CERTIFICATE OF CORRECTION

Patent No. 3,025,672                  March 20, 1962

Gerald H. Syrovy

It is hereby certified that error appears in the above numbered patent requiring correction and that the said Letters Patent should read as corrected below.

Column 2, line 17, for "recomposition chamber" read -- decomposition chambers --; line 47, for "strust" read -- struts --; same column 2, line 52, for "Or" read -- or --; column 3, line 43, for "accessores" read -- accessories --; column 4, line 48, for "2,549,528" read -- 2,659,528 --.

Signed and sealed this 3rd day of July 1962.

(SEAL)
Attest:

ERNEST W. SWIDER
Attesting Officer

DAVID L. LADD
Commissioner of Patents